UNITED STATES PATENT OFFICE.

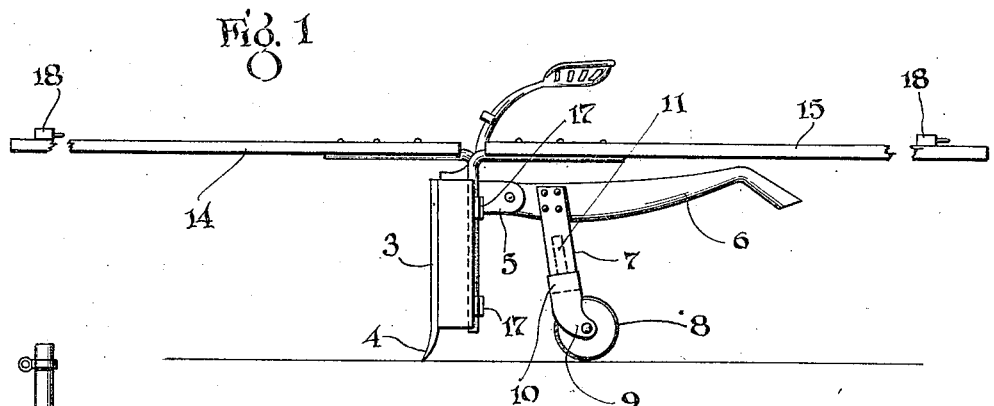
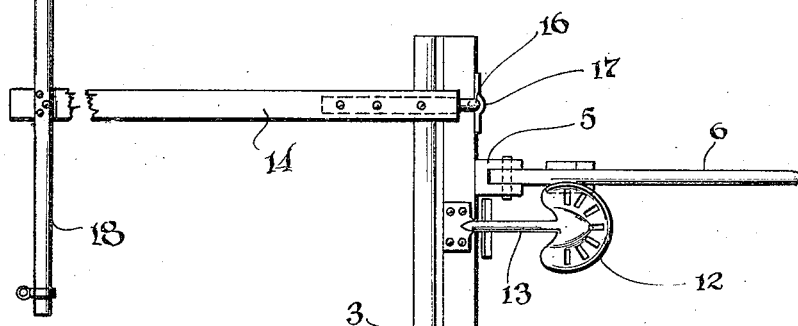
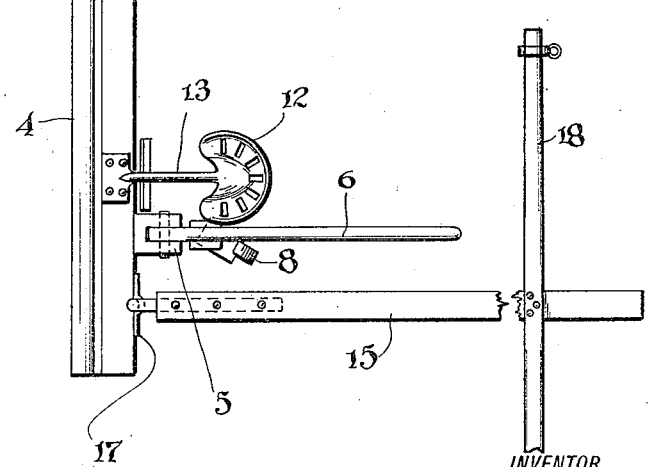

JOHN ANDREW GUTRIDGE AND JAMES AVNUE WOOD, OF McLOUD, OKLAHOMA.

ROAD-DRAG.

1,394,548.   Specification of Letters Patent.   Patented Oct. 25, 1921.

Application filed April 21, 1920.   Serial No. 375,527.

*To all whom it may concern:*

Be it known that we, JOHN ANDREW GUTRIDGE and JAMES AVNUE WOOD, citizens of the United States, and residents of McLoud, in the county of Pottawatomie and State of Oklahoma, have invented certain new and useful Improvements in Road-Drags, of which the following is a specification.

Our invention is an improvement in road drags, and has for its object to provide an implement of the character specified of simple and inexpensive construction, for grading and rounding up smoothly roadways, wherein a scraper plate is provided, having means at its ends for connection with draft animals to travel before and behind the plate, the said plate having means for permitting either or both ends to be lifted.

In the drawings:

Figure 1 is a side view of the improved drag;

Fig. 2 is a top plan view.

In the present embodiment of the invention a scraper is provided, consisting of a beam 1 of suitable length and cross section and of wood or the like, having secured to the forward face thereof a plate 3 of metal, the said plate extending below the beam, as shown, and having its edge sharpened and curved forwardly to form a cutting edge 4.

Near each end of the beam and on its rear face there is secured a substantially U-shaped bracket 5, and between the arms of each of these brackets there is pivoted a lever or handle 6. Each of these handles carries near its pivoted end a standard 7, and a caster wheel 8 is connected with each standard.

Each wheel is journaled between the arms 9 of a yoke, whose body 10 has a pin 11 extending into an axial opening in the stand, the arrangement being such that the wheel is free to swing about the standard. As shown in Fig. 1, the arms 9 of each yoke curve rearwardly, and by pressing down on the rear end of the handle the adjacent end of the scraper may be lifted to vary the depth of the cut, or to prevent it cutting.

A seat 12 is connected to the beam near each end thereof by means of a supporting arm 13 and tongues 14 and 15 are connected with the ends of the beams. An angle rod 16 is secured to one end of each tongue, each rod having a portion secured to the tongue and a portion extending perpendicularly to the tongue, and these depending portions are journaled in bearings 17 on the beam.

Doubletrees 18 are connected with the tongues, and it will be noticed that the tongue 15 extends rearwardly, while the tongue 14 extends forwardly. It will be obvious that either tongue might be swung into the opposite direction from that shown in Fig. 2, that is, to have both tongues in front, both behind or the one at the bottom of Fig. 2 in front and the one at the top behind.

Referring to Fig. 1, it will be seen that two bearings 17 are provided for each tongue, one near the top of the beam and one near the bottom of the beam.

In operation, preferably two teams will be used, one in front of and one behind the beam. By means of the handle 6 the extent of the cutting of the blade may be varied, and just the proper amount may be cut. By inclining the beam the soil may be moved inwardly or may be moved outwardly, as may be desired. When the outer end of the beam is in advance the soil will be moved inwardly.

By holding the lower edge of the blade at the grade desired all portions above the grade may be cut off and those below filled up. By raising the drag with a load, the load may be dumped, to be left in holes. Also by means of the handles, the blades may be held lifted while passing over bridges, railroads and the like.

We claim:

1. A device of the character specified comprising a cutting blade, a tongue connected with each end of the blade to swing on a vertical axis to permit the tongue to extend forwardly or rearwardly from the blade, means at each end of the blade for raising and lowering the same, each of the said means comprising a handle pivoted to the blade near its top and having a standard depending therefrom, a caster wheel connected with each standard, and a reinforcing beam of wood secured to the rear face of the blade, the lower edge of the blade curving forwardly and being sharpened to form a cutting edge.

2. A device of the character specified comprising a cutting blade, a tongue connected with each end of the blade to swing on a vertical axis to permit the tongue to extend forwardly or rearwardly from the blade, means at each end of the blade for raising and lowering the same, each of the said means comprising a handle pivoted to the blade near its top and having a standard depending therefrom, and a caster wheel connected with each standard.

3. A road drag comprising a beam and cutting blade having a cutting edge at the lower portion thereof, a tongue connected with each end of the blade and having means for independent draft attachment, a pair of members pivoted to the blade and beam adjacent to each tongue and inwardly thereof for vertical swinging movement, a standard depending from each member and having a swiveled caster wheel at the lower end thereof, a seat mounted on the beam between said members, and means for actuating said members to raise or lower the blade on the wheels as fulcrums.

JOHN ANDREW GUTRIDGE.
JAMES AVNUE WOOD.